United States Patent
Guillamon

[15] 3,679,222
[45] July 25, 1972

[54] CHILD'S STROLLER

[72] Inventor: Alfonso Guillamon, 612 Columbus St., Salt Lake City, Utah 84103

[22] Filed: Dec. 31, 1970

[21] Appl. No.: 103,053

[52] U.S. Cl. .................................. 280/36 R, 280/36 B
[51] Int. Cl. ........................................... B62b 11/00
[58] Field of Search ............... 280/36 R, 38, 39, 40, DIG. 3, 280/DIG. 4, 41 D; 297/56, 57; 248/431

[56] References Cited

UNITED STATES PATENTS

| | | |
|---|---|---|
| 585,207 | 7/1897 | Hortman .................................. 297/56 |
| 2,587,543 | 2/1952 | Smith ..................................... 297/56 |
| 3,400,943 | 9/1968 | Meiklejohn ........................... 280/41 D |
| 3,189,364 | 6/1965 | Westphal .............................. 280/36 R |

Primary Examiner—Benjamin Hersh
Assistant Examiner—Robert R. Song
Attorney—M. Ralph Shaffer

[57] ABSTRACT

A stroller for small children having legs pivotally connectable to each other such that a collapsed, pole-like structure is obtained for storage when the stroller is not in use. Collapsible brace means are provided to secure the pivoted together legs in an extended position for use. One leg comprises a convenient handle member extending rearwardly of the carrier constructed to support the child.

5 Claims, 8 Drawing Figures

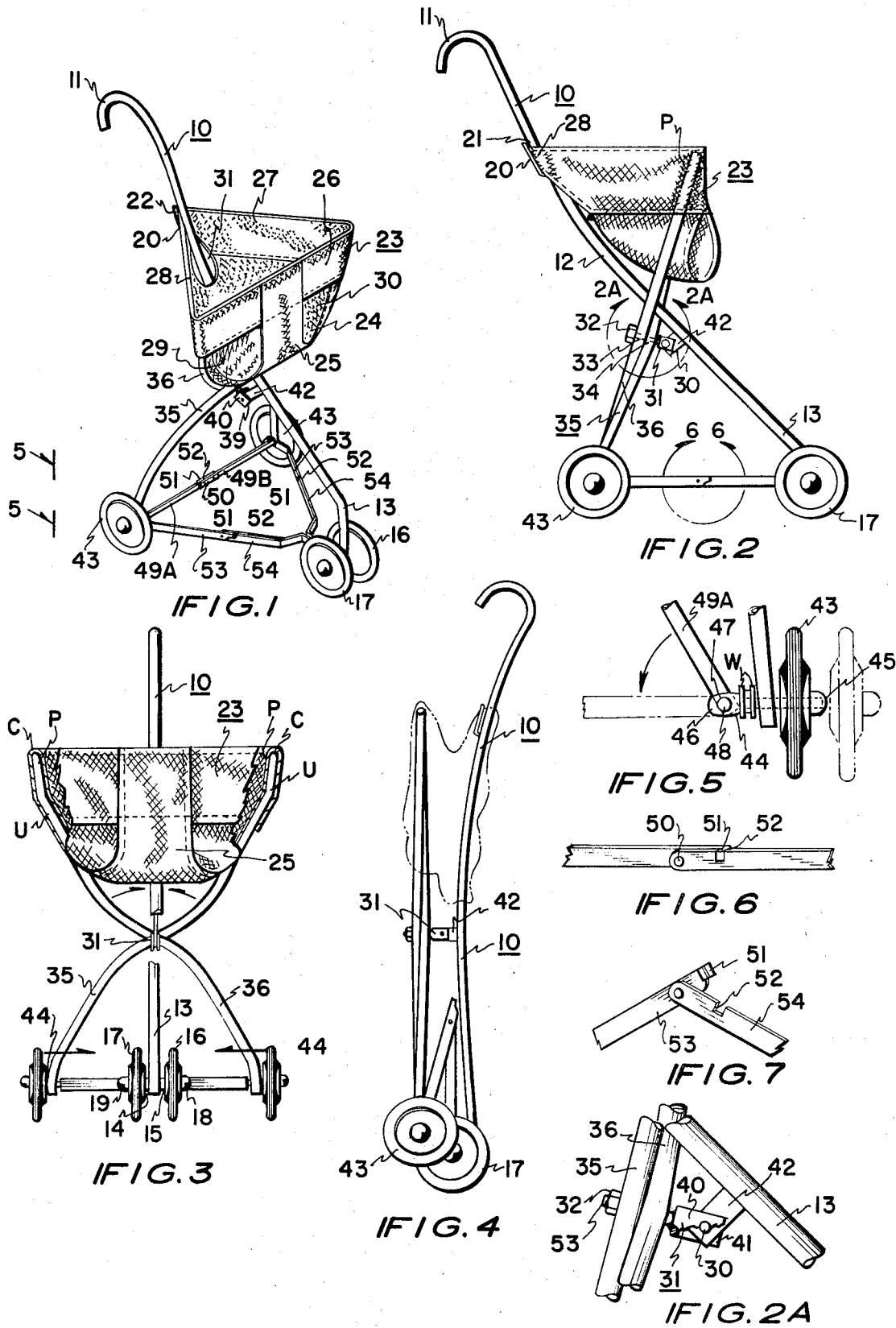

CHILD'S STROLLER

The present invention relates to children's strollers, and, more particularly, to a new and improved child's stroller which can be easily and conveniently extended for use and collapse for storage.

Many types of strollers have been designed heretofore, for use by parents in transporting children down a sidewalk or through a store. Such strollers as have heretofore been designed appear to be quite cumbersome, especially for storage. There is generally no manner of collapsing the stroller both laterally or longitudinally so that a minimum amount of space would be taken up by the stored device.

The present invention avoids prior difficulties in connection with stroller design in using a three-leg structure, the legs being mutually pivoted together such that elongitudinally disposed leg may also serve as a handle, with the laterally disposed legs journalling the rear wheels of the device. In a preferred form of the invention the two lateral or outwardly extending legs are pivoted together and their combination likewise pivoted to an ear or other structure of the forwardly extending leg. By such a construction, the stroller can be collapsed both sideways and also longitudinally. This greatly facilitates storage in a small, compact space. The carrier of the device, preferably made on a fabric, is designed to have pockets or other receiving means for receiving the upper extensions of the legs of the device. The same supports the carrier so that the latter may be used to support a child.

Bracing structure is provided such that the same can be either jack-knifed, for unit storage, or extended horizontally for stroller use.

Accordingly, a principal object of the present invention is to provide a new and improved child's stroller.

A further object is to provide a three-legged stroller of such a design that the legs can be mutually pivoted together, this for extension of the legs for use or contraction of the legs together for storage of the device.

Another object of the invention is to provide an articulative joint for plural legs and a composite handle-leg of a stroller structure.

An additional object of the invention is to provide in a stroller structure suitable leg bracing means which can be collapsed so that the legs may be stored in mutually compact disposition.

A further object is to provide a stroller having a composite leg-handle member, the same being usable to hang the stroller from a hook, or guide the stroller during use.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a stroller constructed in accordance with the principles of the present invention, the same being shown in extended position for use.

FIG. 2 is a side elevation of the device of FIG. 1.

FIG. 2A is an enlarged, fragmentary detail of the clevis, pivot portion of the structure and is taken along the line 2A—2A in FIG. 1.

FIG. 3 is a front elevation of the structure shown in FIG. 1.

FIG. 4 is similar to FIG. 2 but illustrates the device in its collapsed position.

FIG. 5 is an enlarged, fragmentary detail taken along the line 5—5 in FIG. 1, showing a representative wheel structure.

FIG. 6 is an enlarged detail taken along the line 6—6 in FIG. 2 and, indeed, comprises a detail of representative bracing used throughout the structure in FIG. 1 as to the bracing structure between the composite wheel structure.

FIG. 7 is a view similar to FIG. 6 but illustrates a representative brace as being jacknifed preparatory to the entire collapsing of the device for storage.

FIGS. 1–3, handle member 10 is shown to include a handle portion 11, a central portion 12, and a front attachment leg portion 13, see FIG. 3. The latter is provided with a horizontal central aperture 14 receiving axle 15. Axle 15 mounts wheels 16 and 17 which are secured in place by conventionaly cap retainers 18 and 19. The central portion 12 of handle member 10 is provided with an upwardly turned finger 20 forming space 21 for receiving the thickness width 22 of canvas carrier 23. The latter is stitched in the manner shown in FIGS. 1–3 so that the same includes a bottom portion 24 having an upturned flap 25 and integral front and side portions 26–28, the same being stitched together in the manner shown. As seen, there is provided leg apertures 29 and 30 for accommodating the legs of a young child. Aperture 31 accommodates handle member 10, see FIG. 1, with the upturned finger 20 being provided to retain the back 28 of carrier 23 in position.

Central portion 12 includes a rearwardly extending ear 42 being attached by pivot means 30 to clevis 31. Welded to clevis 31 is a bolt 32 which passes through the aligned apertures 33 and 34 of leg members 35 and 36. Bolt 32 is welded, threaded or otherwise secured to clevis 31, see FIG. 2. Sufficient space as at 39 is disposed between the ears 40 and 41 of the clevis so as to allow for a pivotal movement of the handle member ear 42 relative thereto. Each rear wheel 43 is provided with a respective stub axle 44, having secured at its respective outermost end a retainer cap 45. Inner portion 46 of each of the stub axles 44 is preferably flat and also provided with a pivot aperture 47 for receiving a pivot 48 such that a rivet. Secured thereto is a respective arm 49A, 49B which are pivoted together by pivot means 50 and secured in horizontal position by the provision of a finger 51 fitting into groove 52. The finger 51, groove 52 concept is provided throughout the inter-wheel bracing structure so that the rear wheels 43 can be collapsed together and the front wheels 16 and 17 collapsed rearwardly toward the rear wheels. Thus, each of the side members 53 and 54 is provided with the transverse finger and recess structure 51–52 to aid in the forward-to-rearward collapse of this structure, after the members 53 and 54 on each side of the structure are collapsed in the manner shown in FIG. 7. Washer retainers W may be provided as needed.

Members 53 and 54 collapse in the manner illustrated in FIG. 7, and also are horizontally secured together as shown in FIG. 6. This to afford a horizontal collapse of the rear wheels to a "together" position as indicated by the direction of the arrows shown in FIG. 3. Such a collapse is effected when other portions of the leg members 35 and 36 are manually urged together in the region of the carrier.

As to the carrier itself, the same is further stitched to provide for pockets P disposed on opposite sides thereof; the same are used for receiving the upper portions U of legs 35 and 36.

As thus described the structure operates as follows. When in an essentially collapsed position, the fabric or other carrier can be installed by means of slipping the same over handle 10 via aperture 31, such that the bottom portion of the carrier descends into the space between finger 22 and handle member 10. At this point the upper portions U of legs 35 and 36 are inserted into the pockets P of the carrier. Preferably, there should be rounded caps C provided these legs so that no puncturing of the carrier is likely to result.

At this point, the wheels are expanded both sideways relative to wheels 43, and frontwardly relative to wheels 16 and 17, such that the side members 53, 54 on both sides of the carrier and also the rear members 49A and 49B are urged downwardly, so that the recess-finger engagement of the brace structure between the wheels assumes a horizontal position as illustrated in FIGS. 1, 2 and 3. At this juncture the carrier is ready to be used, an infant being positioned within the carrier such that he rests on the bottom thereof, with his legs proceeding out of apertures 29 and 30.

When it is desired to store the equipment in a collapsed condition as seen in FIG. 4, then, once the child is removed, the user simply lifts upwardly at the junctures of the brace structure disposed between the respective rear wheels 43 and between the rear wheels and the front wheels 16, 17 so that the braces collapse (see FIG. 7) to the point shown in FIG. 4. At this point the structure, either with or without the carrier, may be stored.

What is provided hence is a new and improved light-weight carrier having three legs, the same being mutually pivoted together in the manner shown and described such that both expansion of the carrier for use and collapse of the carrier for storage may be accommodated.

It is noted that the journalling the front wheels the handle member itself is used, the same being pivoted to the combination of the two rear legs.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A child's collapsible stroller including, in combination, a slanted, longitudinally oriented, integral handle member having an upper handle portion, a lower leg portion having a lower extremity, and a central portion integrally disposed medially therebetween; a pair of crossed, oppositely and laterally extending leg members having respective upper and lower extremities, first means for pivoting said leg members together for mutual lateral movement, second means disposed at a position lower than said leg members' upper extremities for pivoting said first means to said handle member at said central portion of said handle member for movement about a transverse horizontal axis; wheels secured to said leg portion and said leg members at respective ones of said lower extremities; collapsible brace means for releasably bracing apart in extended position said leg portion and leg members, and a carrier supportingly mounted to said handle member above said second means and also to said laterally extending leg members at the latter's upper extremities, said central portion of said handle member including a rearwardly disposed, upstanding support finger, said carrier including an access aperture receiving said handle member at said central portion whereby said carrier is routed about said central portion and rests upon and is supported by said support finger.

2. A child's collapsible stroller including, in combination, a slanted, longitudinally oriented, integral handle member having an upper handle portion, a lower leg portion having a lower extremity, and a central portion integrally disposed medially therebetween; a pair of crossed, oppositely and laterally extending leg members having respective upper and lower extremities, first means for pivoting said leg members together for mutual lateral movement, second means disposed at a position lower than said leg members' upper extremities for pivoting said first means to said handle member at said central portion of said handle member for movement about a transverse horizontal axis; wheels secured to said leg portion and said leg members at respective ones of said lower extremities; collapsible brace means for releasably bracing apart in extended position said leg portion and leg members, and a carrier supportingly mounted to said handle member above said second means and also to said laterally extending leg members at the latter's upper extremities, and wherein said carrier includes a pair of lateral pockets respectively receiving said upper extremities of said leg members, said carrier also including a pair of leg admittance apertures to accommodate a child's legs and also an additional aperture receiving said handle member, said handle member including means for releasably retaining said carrier in a supported position with respect thereto.

3. A child's collapsible stroller including, in combination, a slanted, longitudinally oriented, integral handle member having an upper handle portion, a lower leg portion having a lower extremity, and a central portion integrally disposed medially therebetween; a pair of crossed oppositely and laterally extending leg members having respective upper and lower extremities, first means for pivoting said leg members together for mutual lateral movement, second means disposed at a position lower than said leg members' upper extremities for pivoting said first means to said handle member at said central portion of said handle member for movement about a transverse horizontal axis; wheels secured to said leg portion and said leg members at respective ones of said lower extremities; collapsible brace means for releasably bracing apart in extended position said leg portion and leg members, and a carrier supportingly mounted to said handle member above said second means and also to said laterally extending leg members at the latter's upper extremities and wherein said first means includes a pivot having an attached clevis, said handle member including a rearwardly extending ear, said second means comprising pivot means pivoting said clevis to said ear.

4. A child's collapsible stroller including, in combination, a slanted, longitudinally oriented, integral handle member having an upper handle portion, a lower leg portion having a lower extremity, and a central portion integrally disposed medially therebetween; a pair of crossed oppositely and laterally extending leg members having respective upper and lower extremities, first means for pivoting said leg members together for mutual lateral movement, second means disposed at a position lower than said leg members' upper extremities for pivoting said first means to said handle member at said central portion of said handle member for movement about a transverse horizontal axis; wheels secured to said leg portion and said leg members at respective ones of said lower extremities; collapsible brace means for releasably bracing apart in extended position said leg portion and leg members, and a carrier supportingly mounted to said handle member above said second means and also to said laterally extending leg members at the latter's upper extremities, and wherein said collapsible brace means comprises respective brace member pairs secured to and between said leg portion and said leg members proximate their respective lower extremities, said pairs being mutually pivoted together and assuming an extended rectilinear configuration, said pairs having locked means for insuring the continuation of such rectilinear configuration until such brace means are intentionally collapsed.

5. A child's collapsible stroller including, in combination, a slanted, longitudinally oriented, integral handle member having an upper handle portion, a lower leg portion having a lower extremity, and a central portion integrally disposed medially therebetween and including a rearwardly disposed upstanding support finger; a pair of crossed, oppositely and laterally extending leg members having respective upper and lower extremities, means proximate said central portion of said handle member and disposed vertically lower than said leg members' upper extremities and said finger for providing an articulative joint with respect to said leg members and handle portion such that these may assume an outwardly extended, centrallly held-together configuration and also a collapsed configuration, wheels secured to said leg portion and said leg members at respective ones of said lower extremities, collapsible brace means for releasably bracing apart in extended position said leg portion and leg members, and a carrier supportingly mounted around said handle member and supportingly engaging said support finger and also mounted to said laterally extending leg members at the latter's upper extremities.

* * * * *